Jan. 27, 1942.  J. OCHOA  2,271,398
SAWING DEVICE
Filed June 14, 1941
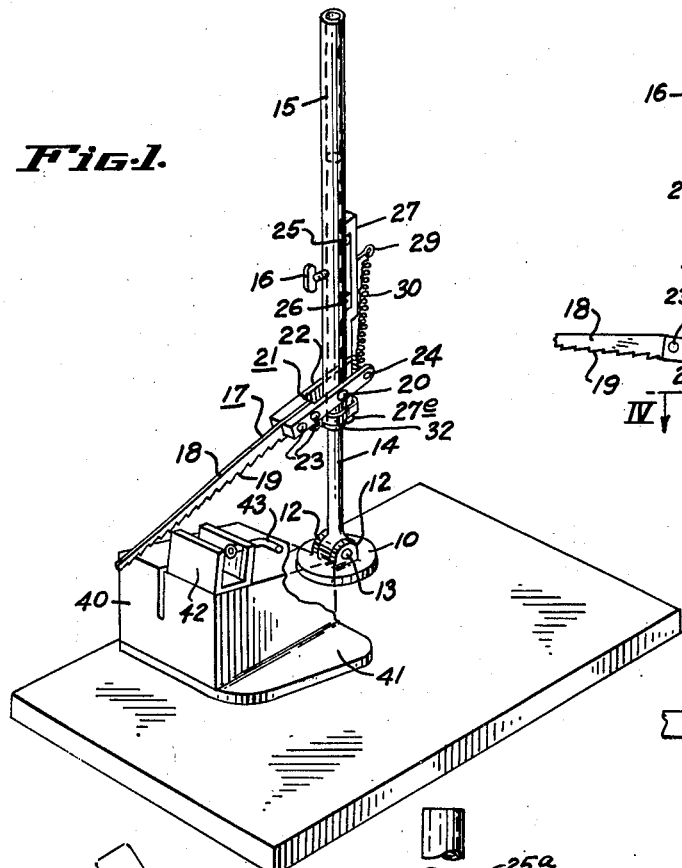
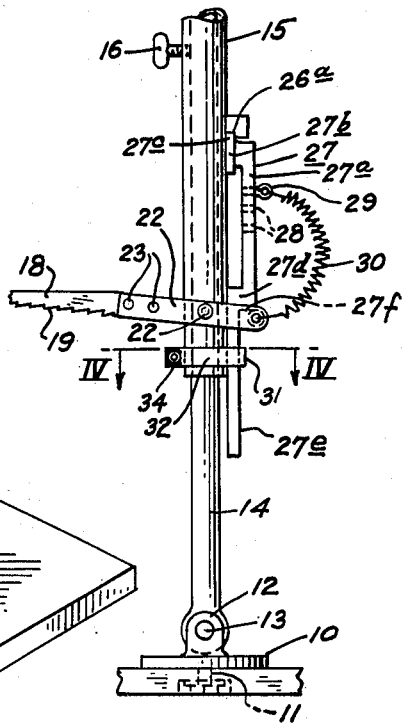
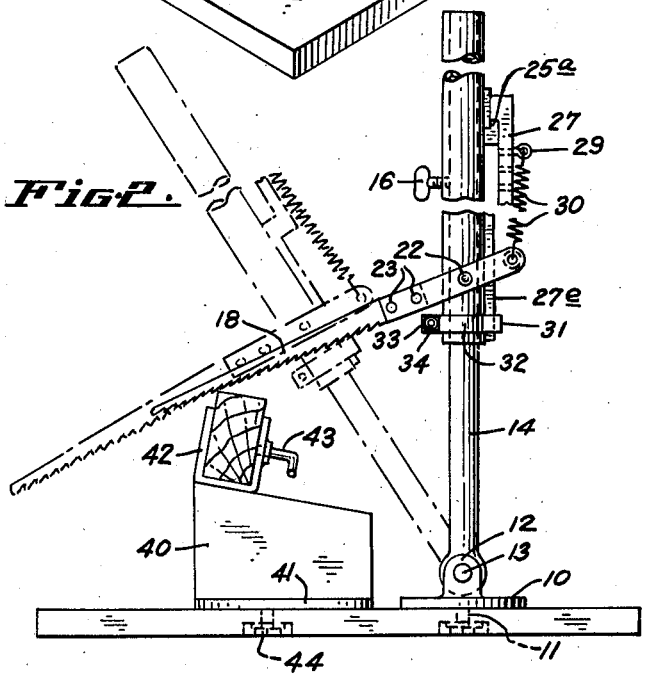
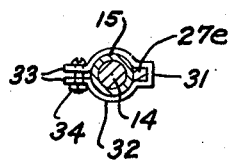
INVENTOR.
JOSE OCHOA
BY
ATTORNEY.

Patented Jan. 27, 1942

2,271,398

UNITED STATES PATENT OFFICE 2,271,398

SAWING DEVICE

José Ochoa, San Francisco, Calif.

Application June 14, 1941, Serial No. 398,079

8 Claims. (Cl. 143—64)

This invention relates to a sawing device and more particularly to a simplified saw structure in which leverage may be applied to the saw blade.

There are in the prior structures of this type numerous devices for operating a saw member by means of a pivoted lever but they are complicated in structure and expensive in manufacture.

Among the objects of the present invention are to provide a sawing device economical to manufacture and efficient in operation in which a saw member is pivotally mounted with relation to a lever and mechanically actuated into contact with a piece of material to be sawed; a further object is to provide a spring-actuated saw member mounted upon a lever which may be swung in an arc on a pivoted base; a further object is to provide a saw device of the character previously mentioned in which the mounting for the saw on a swinging lever may be adjusted upwardly and downwardly and in which an adjustable spring-tensioning of the saw is provided; a further object is to provide a saw device of the character above mentioned which may be employed with a saw block for holding the material to be sawed.

With the foregoing and other objects in view, all of which will be more apparent as this description proceeds, the invention is exemplified in one form in the novel construction and combination of parts hereinafter described, illustrated in the accompanying drawing, and pointed out in the claims hereto appended, it being understood that various changes in the form, proportion, size and details of construction of the apparatus may be resorted to within the scope of the appended claims without departing from the spirit or sacrificing any of the advantages of the invention.

To more clearly comprehend the invention, reference is directed to the accompanying drawing wherein:

Fig. 1 is a perspective view of the invention in vertical position.

Fig. 2 is a side view of the invention in which some of the parts are fragmentarily shown and including dotted lines to show varying operative positions.

Fig. 3 is an enlarged fragmentary side view of portions of the apparatus.

Fig. 4 is a lateral transverse section on line IV—IV of Fig. 3.

Referring to the drawing in which like characters of a reference indicate corresponding parts in the several views, 10 is a base which may be mounted on any suitable foundation by means of a bolt 11, the base having lugs 12 with a pivot pin 13 therethrough. The pivot pin 13 pivotally mounts a standard 14, the upper end of which may thus swing in an arc. Slidably mounted longitudinally of the standard 14 is a sleeve member 15 which may be adjusted longitudinally of the standard by a clamping bolt 16. At the lower portion of the sleeve 15 there is mounted a saw member generally indicated 17 which has a saw blade 18 having the usual teeth 19. At the end which would be the handle end in a hand manipulated saw, and which is referred to herein as the "handle end" of the saw, the blade 18 is pivotally mounted by pivot pin 20 to sleeve 15 by a yoke 21 which is bifurcated and has arms 22 secured intermediate their ends to the sleeve 15 by the pivot 20. The arms 22 have extensions laterally transversely in opposite directions from the pivoted portion at 20, one end of the arms being securely fastened as at 23 to the handle end of the saw blade, and the opposite end extends free beyond sleeve 15, the opposite arms 22 being suitably connected at the free end as by bolt 24.

The sleeve 15 is provided with longitudinally spaced stop members, the upper one being 25 and the lower one being indicated 26, each of which has notches therein, 25a and 26a. Slidably mounted upon the sleeve 15 is a slide block 27 which is more or less shaped as the conventional question mark having a portion 27a spaced from and parallel to the sleeve and having an upper arm 27b extending toward and resting upon the circumference of the sleeve 15 and being provided at its end with a flange 27c, the edge portion of which is adapted to engage the notches 25a and 26a when the slide block is in its respective upper and lower positions. The lower arm 27d of the slide block also extends toward and is adapted to slidably bear upon the sleeve 15 and has a downwardly extending tongue 27e of narrower width than the arm 27d thus providing a shoulder 27f. The vertical portion 27a of the slide block is provided with spaced recesses 28 into which may be selectively inserted an eyelet pin 29 to which one end of a coil spring member 30 is attached. The opposite end of the spring member 30 is attached to the bolt 24 at the free end of yoke 21 to provide spring tension between the free end of the arms 22 and the slide block. When the slide block is in an upwardly spaced position relative to the sleeve 15, in which position the spring is tensioned as shown in Fig. 1 the free end of the yoke is urged upwardly thus exerting a downward leverage on the saw blade 18 by means of the pivoted arms of the yoke 21. The tongue 27e of the slide block is guided by a bracket 31 of a clamp member 32 which is fixedly mounted at the lower end of the sleeve 15 by clamping ears 33 having a bolt 34 therethrough, the ears 33 providing a forwardly extending lug to limit the downward movement of the saw blade when it is actuated downwardly by the tension of spring 30. Obviously the tension of the spring 30 may be adjusted by placing the pin 29 in any of the selected recesses 28, since this is advantageous in sawing different types of material such as hardwood as compared with soft wood.

When it is desired that the saw shall be in operative position inclined downwardly, the slide block 27 is raised to an upwardly disposed position on the sleeve 15 so that the flange 27c engages the notch 25a of the upper stop member 25, thus tensioning the spring 30 and providing a resiliently leveraged downward inclination of the saw blade 18. In order to position the saw in an upwardly inclined inoperative position, as shown in Fig. 3, the slide block is disengaged from the upper stop member 25 and the flange member 27c is then engaged in the notch 26a at the under side of the lower stop member 26, whereupon the shoulder 27f engages the bolt or pin 24 and maintains the saw at the inoperative upwardly inclined position.

If it is desired to make an extremely simplified structure in which the saw mechanism is not longitudinally adjustable on the standard 14, the sleeve member 15 may be eliminated and the saw pivoted directly upon the standard, and likewise the stop members 25, 26 and clamp member 32.

For advantageously employing the saw for sawing relatively small pieces of material, a sawing block 40 is provided for holding the piece to be sawed. Preferably, it is provided with an extension base member 41 which may be engaged by the foot of an operator when operating the saw. Upon the saw block is mounted a channelbox means 42 for holding a block of wood to be sawed. A suitable clamp 43 may also be mounted on the channel-box. Since the sawing block 40 may be maintained at a particular position by the foot of the operator upon blade 41, it is not believed necessary that it be otherwise stabilized, but if such stabilizing means are desired the block may be secured to a base member by a recessed bolt 44 upon which the block 40 may be rotatably mounted.

Manifestly, the standard 14 and sleeve 15 may be arcuately swung at its upper end on the pivot member 13 and thus actuate the saw blade forwardly and backwardly in substantially the same plane with the standard. Meanwhile, the free end of the yoke arms 22 move upwardly responsive to tension of spring 30, and provide a downward leverage on the saw blade in contact with the member to be sawed, the latter being mounted in the channelbox member 42 of the saw block, the excessive downward motion of the saw blade being limited by lug 34 formed of ears 33 of the clamp member 32.

Having thus described my invention, I claim:

1. A sawing device comprising a base, a standard pivotally mounted at one end on the base so that its free end may swing in an arc, said standard having spaced stop members intermediate its ends, a saw blade pivotally mounted at its handle end to the standard and having a portion extending therebeyond, a slide block adapted for selectively and releasably engaging the stop members, and a spring member connected to the extended end portion of the handle end of the saw and to the slide block.

2. A sawing device comprising a base, a standard pivotally mounted at one end on the base so that its free end may swing in an arc, said standard having spaced stop notched members intermediate its ends, a saw blade pivotally mounted at its handle end to the standard and having a portion extending therebeyond, a slide block adapted for selectively and releasably engaging the stop members and having a lug at its upper end for engaging the notches of the stop members, and a spring member connected to the extended end portion of the handle end of the saw and to the slide block.

3. A sawing device comprising a base, a standard pivotally mounted at one end on the base so that its free end may swing in an arc, said standard having spaced stop members intermediate its ends, a saw blade having a bifurcated yoke fixedly secured thereto at its handle end, said yoke having arms straddling the standard and being pivotally connected to the standard intermediate the ends of the yoke arms, a slide block adapted for selectively and releasably engaging the stop members, and a spring member connected to the extended end portion of the yoke arms and to the slide block.

4. A sawing device comprising a base, a standard pivotally mounted at one end on the base so that its free end may swing in an arc, said standard having spaced stop members intermediate its ends, a saw blade having a bifurcated yoke fixedly secured thereto at its handle end, said yoke having arms straddling the standard and being pivotally connected to the standard intermediate the ends of the yoke arms, a slide block adapted for selectively and releasably engaging the stop members having a tongue extension at its lower end for sliding between the yoke arms at the free end of the yoke and having a shoulder for engaging the outer end of the yoke when the saw blade is at an inoperative raised position, means for guiding the slide block, and a spring member connected to the extended end portion of the yoke arms and to the slide block.

5. A sawing device comprising a base, a standard pivotally mounted at one end on the base so that its free end may swing in an arc, a tubular sleeve slidably mounted co-axially upon the standard, means for fixedly positioning the sleeve at selectively adjustable positions longitudinally of the standard, said sleeve having spaced stop members intermediate its ends, a saw blade having a bifurcated yoke fixedly secured thereto at its handle end, said yoke having arms straddling the sleeve and being pivotally connected to the sleeve of the standard intermediate the ends of the yoke arms, a slide block adapted for selectively and releasably engaging the stop members, and a spring member connected to the extended end portion of the yoke arms and to the slide block.

6. A sawing device comprising a base, a standard pivotally mounted at one end on the base so that its free end may swing in an arc, a tubular sleeve slidably mounted co-axially upon the standard, means for fixedly positioning the sleeve at selectively adjustable positions longitudinally of the standard, said sleeve having spaced stop members intermediate its ends, a saw blade having a bifurcated yoke fixedly secured thereto at its handle end, said yoke having arms straddling the sleeve and being pivotally connected to the sleeve of the standard intermediate the ends of the yoke arms, a slide block adapted for selectively and releasably engaging the stop members and having a shoulder for engaging the outer end of the yoke when the saw blade is at an inoperative raised position, and a spring member connected to the extended end portion of the yoke arms and to the slide block.

7. A sawing device comprising a base, a standard pivotally mounted at one end on the base so that its free end may swing in an arc, a tubular sleeve slidably mounted co-axially upon the standard, means for fixedly positioning the sleeve at selectively adjustable positions longitudinally of the standard, said sleeve having spaced stop notched members intermediate its ends, a saw blade having a bifurcated yoke fixedly secured thereto at its handle end, said yoke having arms straddling the sleeve and being pivotally connected to the sleeve of the standard intermediate the ends of the yoke arms, a slide block adapted for selectively and releasably engaging the stop members, and having a lug at its upper end for engaging the notches of the stop members, means for guiding the slide block, and a spring member connected to the extended end portion of the yoke arms and to the slide block.

8. A sawing device comprising a base, a standard pivotally mounted at one end on the base so that its free end may swing in an arc, a tubular sleeve slidably mounted co-axially upon the standard, means for fixedly positioning the sleeve at selectively adjustable positions longitudinally of the standard, said sleeve having spaced stop members intermediate its ends, a saw blade having a birfurcated yoke fixedly secured thereto at its handle end, said yoke having arms straddling the sleeve and being pivotally connected to the sleeve of the standard intermediate the ends of the yoke arms, a slide block adapted for selectively and releasably engaging the stop members having a tongue extension at its lower end for sliding between the yoke arms at the free end of the yoke and having a shoulder for engaging the outer end of the yoke when the saw blade is at an inoperative raised position, means for guiding the slide block, and a spring member connected to the extended end portion of the yoke arms and to the slide block.

JOSÉ OCHOA.